United States Patent
Juan et al.

(10) Patent No.: US 9,941,751 B2
(45) Date of Patent: Apr. 10, 2018

(54) METHOD FOR PERFORMING WIRELESS CHARGING CONTROL OF AN ELECTRONIC DEVICE WITH AID OF PREDETERMINED DATA IN NON-VOLATILE MEMORY, AND ASSOCIATED APPARATUS

(71) Applicant: MEDIATEK INC., Hsin-Chu (TW)

(72) Inventors: Kuan-Kai Juan, Hsinchu County (TW); Li-Ting Tsai, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 232 days.

(21) Appl. No.: 14/242,858

(22) Filed: Apr. 1, 2014

(65) Prior Publication Data

US 2015/0214773 A1 Jul. 30, 2015

Related U.S. Application Data

(60) Provisional application No. 61/931,788, filed on Jan. 27, 2014.

(51) Int. Cl.
*H02J 7/00* (2006.01)
*H02J 50/60* (2016.01)
(Continued)

(52) U.S. Cl.
CPC ............. *H02J 50/60* (2016.02); *H02J 7/007* (2013.01); *H02J 7/025* (2013.01); *H02J 50/00* (2016.02);
(Continued)

(58) Field of Classification Search
CPC .. H02J 7/025; H02J 7/007; H02J 50/60; H02J 50/10; H02J 50/80; H02J 50/40; H02J 50/00
See application file for complete search history.

(56) References Cited

U.S. PATENT DOCUMENTS

| 2011/0196544 A1* | 8/2011 | Baarman | H01F 38/14 700/291 |
| --- | --- | --- | --- |
| 2012/0242285 A1 | 9/2012 | Jung | |

(Continued)

FOREIGN PATENT DOCUMENTS

| CN | 101147308 A | 3/2008 |
| --- | --- | --- |
| CN | 102823101 A | 12/2012 |

(Continued)

OTHER PUBLICATIONS

Office Action dated Oct. 21, 2015 from corresponding Taiwan Patent Application No. 10421415430.
Office Action dated Oct. 9, 2016 for Chinese Application No. 201510029883.3.

*Primary Examiner* — Nha Nguyen
(74) *Attorney, Agent, or Firm* — Wolf, Greenfield & Sacks, P.C.

(57) ABSTRACT

A method for performing wireless charging control of an electronic device and an associated apparatus are provided, where the method includes: performing at least one detection operation at a direct current (DC) output terminal of a rectifier of the electronic device to generate at least one detection result, wherein two alternating current (AC) input terminals of the rectifier are coupled to two terminals of a power input coil of the electronic device, and the at least one detection operation is not performed at the power input coil; and estimating input power of the power input coil according to the at least one detection result with aid of a set of predetermined data, and sending a packet carrying information corresponding to the estimated input power, for performing wireless charging foreign object detection (FOD), wherein the set of predetermined data is stored in a non-volatile (NV) memory of the electronic device.

21 Claims, 4 Drawing Sheets

(51) Int. Cl.
*H02J 7/02* (2016.01)
*H02J 50/10* (2016.01)
*H02J 50/40* (2016.01)
*H02J 50/00* (2016.01)
*H02J 50/80* (2016.01)

(52) U.S. Cl.
CPC .............. *H02J 50/10* (2016.02); *H02J 50/40* (2016.02); *H02J 50/80* (2016.02)

(56) References Cited

U.S. PATENT DOCUMENTS

| | | | |
|---|---|---|---|
| 2012/0293006 A1* | 11/2012 | Kim | H04B 5/0031 307/104 |
| 2013/0069441 A1 | 3/2013 | Verghese | |
| 2013/0076153 A1 | 3/2013 | Murayama | |
| 2013/0094598 A1* | 4/2013 | Bastami | H02J 5/005 375/259 |
| 2013/0163635 A1 | 6/2013 | Karanth | |
| 2013/0181724 A1 | 7/2013 | Teggatz | |
| 2013/0257168 A1* | 10/2013 | Singh | H02J 17/00 307/104 |

FOREIGN PATENT DOCUMENTS

| | | |
|---|---|---|
| TW | 201347346 | 11/2013 |
| TW | 201401714 | 1/2014 |

\* cited by examiner

METHOD FOR PERFORMING WIRELESS CHARGING CONTROL OF AN ELECTRONIC DEVICE WITH AID OF PREDETERMINED DATA IN NON-VOLATILE MEMORY, AND ASSOCIATED APPARATUS

CROSS REFERENCE TO RELATED APPLICATIONS

This application claims the benefit of U.S. Provisional Application No. 61/931,788, which was filed on Jan. 27, 2014, and is included herein by reference.

BACKGROUND

The present invention relates to foreign object detection (FOD) of a wireless power transfer system, and more particularly, to a method for performing wireless charging control of an electronic device, and an associated apparatus.

According to the related art, a conventional wireless power transfer system may comprise a conventional transmitter pad that is arranged to charge a conventional electronic device wirelessly. As a foreign object nearby, such as a metallic objects or magnetic object, may absorb energy from the conventional transmitter pad, the foreign object may be heated. In a situation where the temperature of the foreign object increases rapidly, it may be harmful and dangerous. In order to solve this problem, some conventional FOD methods are proposed. However, further problems such as some side effects may occur. For example, inaccuracy of the input power estimation of the conventional electronic device may cause a false alarm or detection failure. In another example, the input power estimation of the conventional electronic device typically relies on a hardware component that may need to be carefully tuned in a design phase or a mass production phase of the conventional electronic device, causing related costs to be increased. Thus, a novel method is required to enhance the accuracy of the input power estimation for electronic devices that are wirelessly charged.

SUMMARY

It is an objective of the claimed invention to provide a method for performing wireless charging control of an electronic device, and an associated apparatus, in order to solve the above-mentioned problems.

According to at least one preferred embodiment, a method for performing wireless charging control of an electronic device is provided, where the method comprises the steps of: performing at least one detection operation at a direct current (DC) output terminal of a rectifier of the electronic device to generate at least one detection result, wherein two alternating current (AC) input terminals of the rectifier are coupled to two terminals of a power input coil of the electronic device; and estimating input power of the power input coil according to the at least one detection result with aid of a set of predetermined data, and sending a packet carrying information corresponding to the estimated input power, for performing wireless charging foreign object detection (FOD), wherein the set of predetermined data is stored in a non-volatile (NV) memory of the electronic device.

According to at least one preferred embodiment, an apparatus for performing wireless charging control of an electronic device is provided, where the apparatus comprises at least one portion of the electronic device. The apparatus comprises a NV memory, a detection module, and a controller, where the detection module is coupled to a DC output terminal of a rectifier of the electronic device, and the controller is coupled to the NV memory and the detection module. More particularly, two AC input terminals of the rectifier are coupled to two terminals of a power input coil of the electronic device. In addition, the NV memory is arranged to store information for the electronic device, and the detection module is arranged to perform at least one detection operation at the DC output terminal of the rectifier to generate at least one detection result. Additionally, the controller is arranged to estimate input power of the power input coil according to the at least one detection result with aid of a set of predetermined data, and send a packet carrying information corresponding to the estimated input power, for performing wireless charging FOD, wherein the set of predetermined data is stored in the NV memory.

It is an advantage of the present invention that the present invention method and the associated apparatus can accurately estimate the input power of the power input coil, and therefore the related art problems such as the aforementioned false alarm or detection failure can be prevented. In addition, as the set of predetermined data can be prepared in advance for products implemented according to the present invention method and the associated apparatus, it is unnecessary to use the aforementioned hardware component that needs to be carefully tuned.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
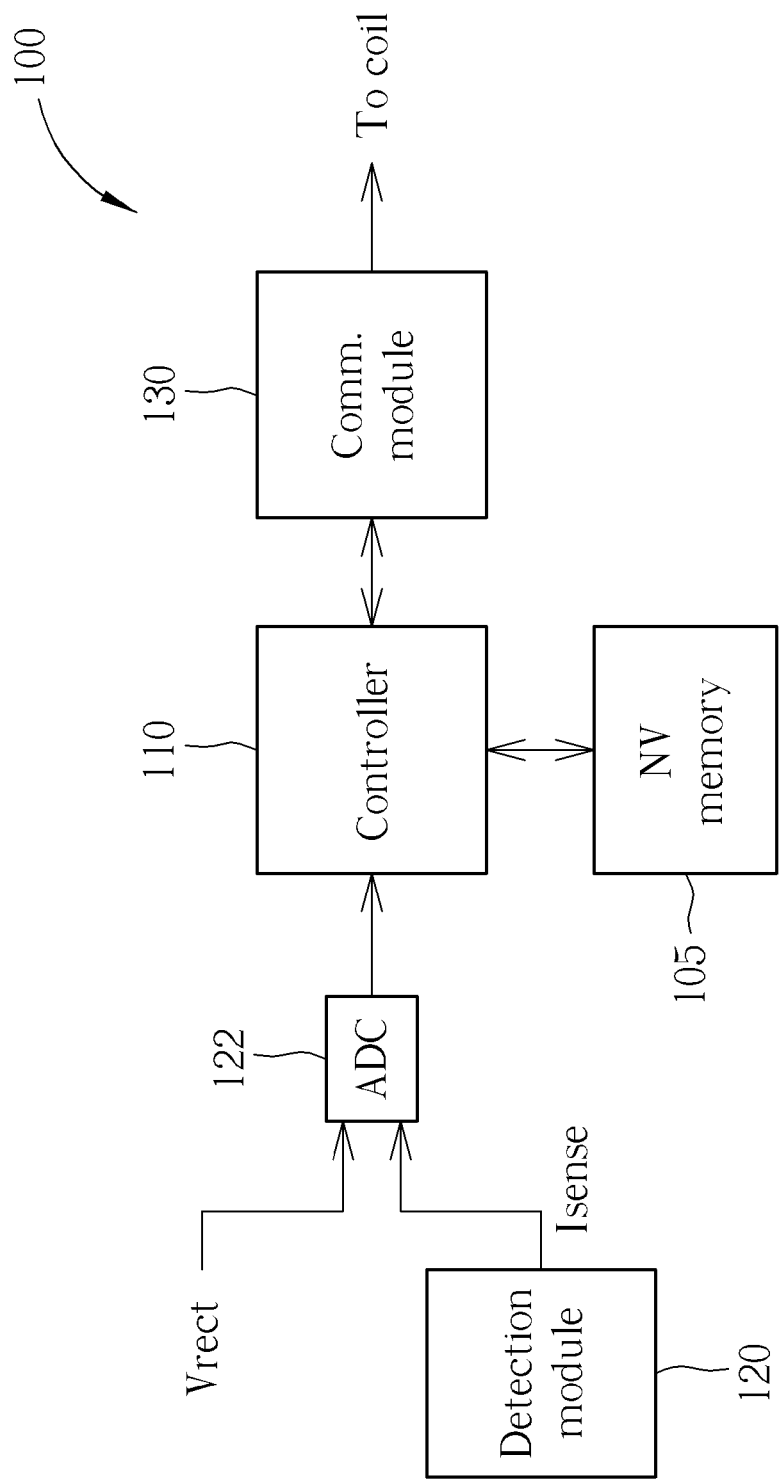
FIG. 1 is a diagram of an apparatus for performing wireless charging control of an electronic device according to a first embodiment of the present invention.

Please refer to FIG. 1, which illustrates a diagram of an apparatus 100 for performing wireless charging control of an electronic device according to a first embodiment of the present invention, where the apparatus 100 may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device and associated circuits thereof. In another example, the apparatus 100 can be the whole of the electronic device mentioned above. In another example, the apparatus 100 may comprise a system comprising the electronic device mentioned above (e.g. a wireless power transfer system comprising the electronic device). Examples of the electronic device may include, but not limited to, a mobile phone (e.g. a multifunctional mobile phone), a personal digital assistant (PDA), and a personal computer such as a laptop computer.

As shown in FIG. 1, the apparatus 100 may comprise a non-volatile (NV) memory 105 (e.g. an electrically erasable programmable read only memory (EEPROM), or a Flash memory), a controller 110 (e.g. a microprocessor), a detection module 120, an analog-to-digital converter (ADC) 122, and a communications module 130 (labeled "Comm. module" in FIG. 1, for brevity), where the controller 110 is coupled to the NV memory 105, and is coupled to the detection module 120 through the ADC 122, and is further coupled to the communications module 130, and the communications module 130 can be coupled to a coil such as a power input coil (not shown in FIG. 1) of the electronic device. According to this embodiment, the NV memory 105 is arranged to store information for the electronic device, such as predetermined information regarding wireless charging, and the controller 110 is arranged to perform wireless charging control. In addition, the detection module 120 is arranged to perform some detection operations (e.g. current detection operations and/or voltage detection operations) for the controller 110, and the ADC 122 is arranged to perform analog-to-digital conversion on the detection signal Isense of the detection module 120, in order to generate a digital signal, which may carry at least one digital value (e.g. one or more digital values). Additionally, the communications module 130 is arranged to wirelessly communicate with an external device (which is positioned outside the electronic device) for the controller 110 by utilizing the coil mentioned above, such as the aforementioned power input coil of the electronic device.

More particularly, the controller 110 may perform input power estimation in a situation where the electronic device is charged wirelessly, to generate accurate information regarding the power that is received through wireless charging, for performing wireless charging foreign object detection (FOD). As the apparatus 100 can accurately estimate the power that is received through wireless charging, the related art problems such as aforementioned false alarm or detection failure can be prevented. Regarding implementation details of the wireless charging FOD mentioned above, please refer to the Wireless Power Consortium (WPC) Qi V1.1 standard for more information.

Please note that, for better comprehension, the ADC 122 of this embodiment can be illustrated to be positioned outside the detection module 120. This is for illustrative purposes only, and is not meant to be a limitation of the present invention. According to some variations of this embodiment, the ADC 122 can be integrated into the detection module 120, while the associated operations of the detection module 120 and the ADC 122 mentioned in the embodiment shown in FIG. 1 will not be hindered.

Figure 2:
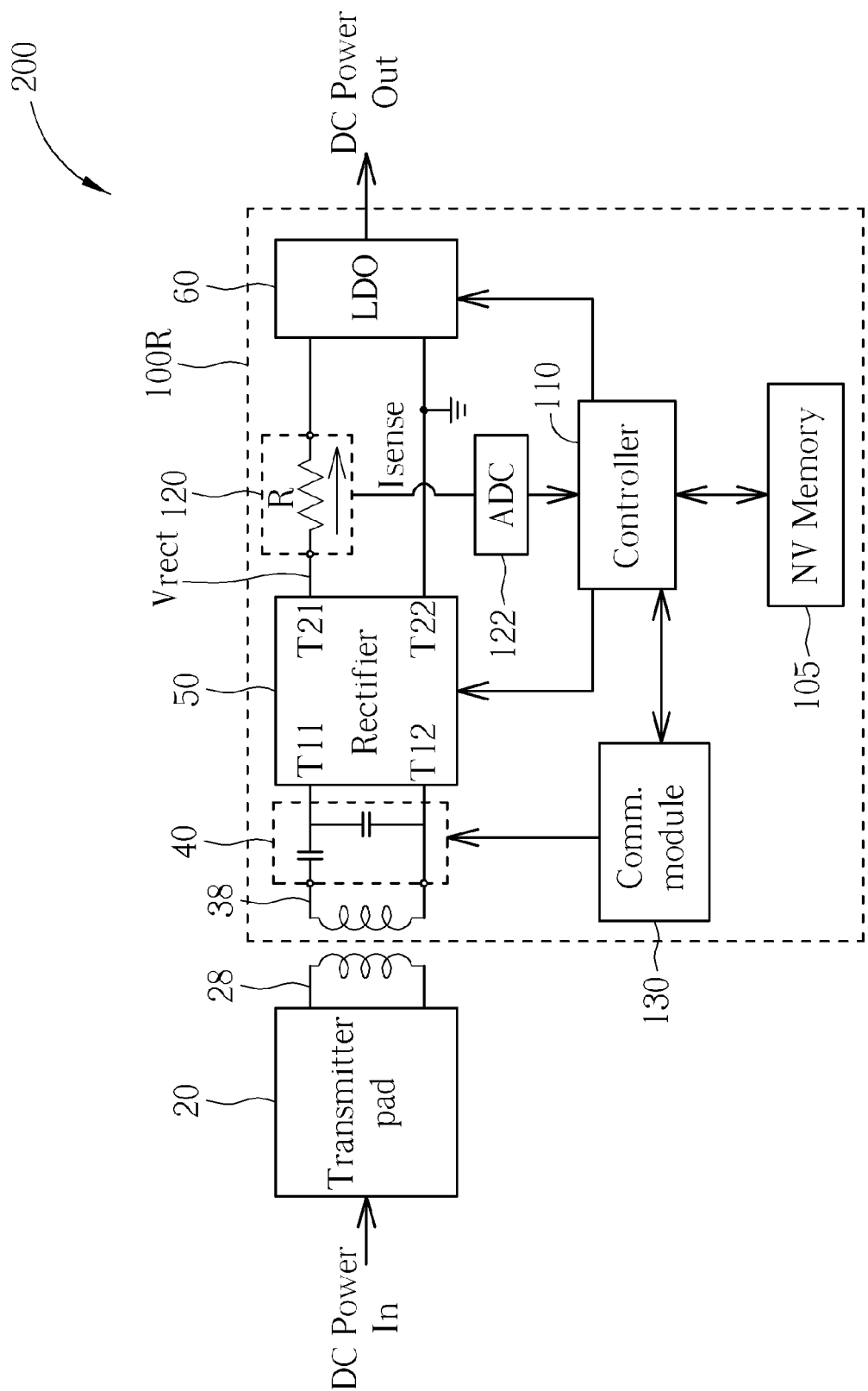
FIG. 2 is a diagram of a wireless power transfer system according to an embodiment of the present invention.

FIG. 2 is a diagram of a wireless power transfer system 200 according to an embodiment of the present invention, where the apparatus 100 may comprise at least one portion (e.g. a portion or all) of the wireless power transfer system 200. For example, the apparatus 100 may comprise a portion of the wireless power transfer system 200, and more particularly, can be a wireless charging receiver 100R (which can also be referred to as the receiver, for brevity) within the electronic device mentioned above, which means the apparatus 100 may comprise all components within the wireless charging receiver 100R shown in FIG. 2. In another example, the apparatus 100 may comprise a portion of the wireless power transfer system 200, and more particularly, can be the whole of the electronic device mentioned above, which means the apparatus 100 may comprise all components within the electronic device. In another example, the apparatus 100 can be the whole of the wireless power transfer system 200.

As shown in FIG. 2, in addition to the wireless charging receiver 100R, the wireless power transfer system 200 may further comprise a transmitter pad 20 equipped with a power output coil 28. For better comprehension, the power output coil 28 can be illustrated outside the transmitter pad 20. This is for illustrative purposes only, and is not meant to be a limitation of the present invention. According to some variations of this embodiment, the power output coil 28 can be integrated into the transmitter pad 20. According to this embodiment, in addition to the NV memory 105, the controller 110, the detection module 120, the ADC 122, and the communications module 130 mentioned above, the wireless charging receiver 100R may further comprise a power input coil 38, a matching circuit 40, a rectifier 50, and a low dropout (LDO) regulator 60 (labeled "LDO" in FIG. 2, for brevity), where the detection module 120 is coupled to the direct current (DC) output terminal T21 of the rectifier 50 of the electronic device through the ADC 122, and the two alternating current (AC) input terminals T11 and T12 of the rectifier 50 are coupled to the two terminals of the power input coil 38 of the electronic device. In this embodiment, the terminal T22 of the rectifier 50 can be regarded as a ground terminal, and the two terminals T21 and T22 can be utilized for coupling the next stage such as the LDO regulator 60. More particularly, the rectifier 50 may obtain an AC input from the power input coil 38 through the two AC input terminals T11 and T12 of the rectifier 50, and rectifies the AC input to provide a DC output at the DC output terminal T21, such as a DC voltage level Vrect with respect to a ground voltage level at the terminal T22 (i.e. the ground terminal), where the ADC 122 may utilize the DC voltage level Vrect mentioned above (i.e. the DC voltage level Vrect shown in FIG. 1). For example, the AC input can be obtained from the power input coil 38 when the electronic device is wirelessly charged through the power input coil 38 by the transmitter pad 20.

In practice, the matching circuit 40 may comprise some impedance components such as some capacitors. In addition, the detection module 120 may comprise a current sensing resistor R, where one of the two terminals of the current sensing resistor R (e.g. the left terminal thereof in this embodiment) is coupled to the DC output terminal T21 of the rectifier 50, and another of the two terminals of the current sensing resistor R (e.g. the right terminal thereof in this embodiment) is coupled to a DC input terminal of the next stage of the rectifier 50, such as the upper left terminal of the LDO regulator 60 in this embodiment. Additionally, the ADC 122 mentioned above is coupled to the detection module 120, and more particularly, is coupled to the current sensing resistor R of the detection module 120 in this embodiment, for performing analog-to-digital conversion on the detection signal Isense of the detection module 120, in order to generate the digital signal mentioned in the embodiment shown in FIG. 1.

Based on the architecture shown in FIG. 2, electric power may be transferred from the left side (e.g. the input labeled "DC Power In" in the leftmost of FIG. 2) to the right side (e.g. the input labeled "DC Power Out" in the rightmost of FIG. 2) stage by stage, where power loss may occur in some of the stages in this architecture. In a situation where a foreign object, such as a metallic objects or magnetic object, occasionally drops nearby and starts absorbing energy from the transmitter pad 20 of this embodiment, the controller 110 can accurately estimate the received power of the power input coil 38 and send a received power report corresponding to the received power (e.g. a received power packet corresponding to the estimated value of the received power) to the transmitter pad 20 through related components (e.g. the communications module 130, the matching circuit 40, the power input coil 38, and the power output coil 28) for performing wireless charging FOD. As a result, the transmitter pad 20 may stop outputting power toward the electronic device right away, where the related art problems such as the aforementioned false alarm or detection failure can be prevented.

According to this embodiment, the LDO regulator 60 can be utilized as the next stage of the rectifier 50. This is for illustrative purposes only, and is not meant to be a limitation of the present invention. According to some variations of this embodiment, the LDO regulator 60 can be omitted, and some circuits of the electronic device mentioned above may directly utilize the aforementioned DC output such as the DC voltage level Vrect mentioned above.

Figure 3:
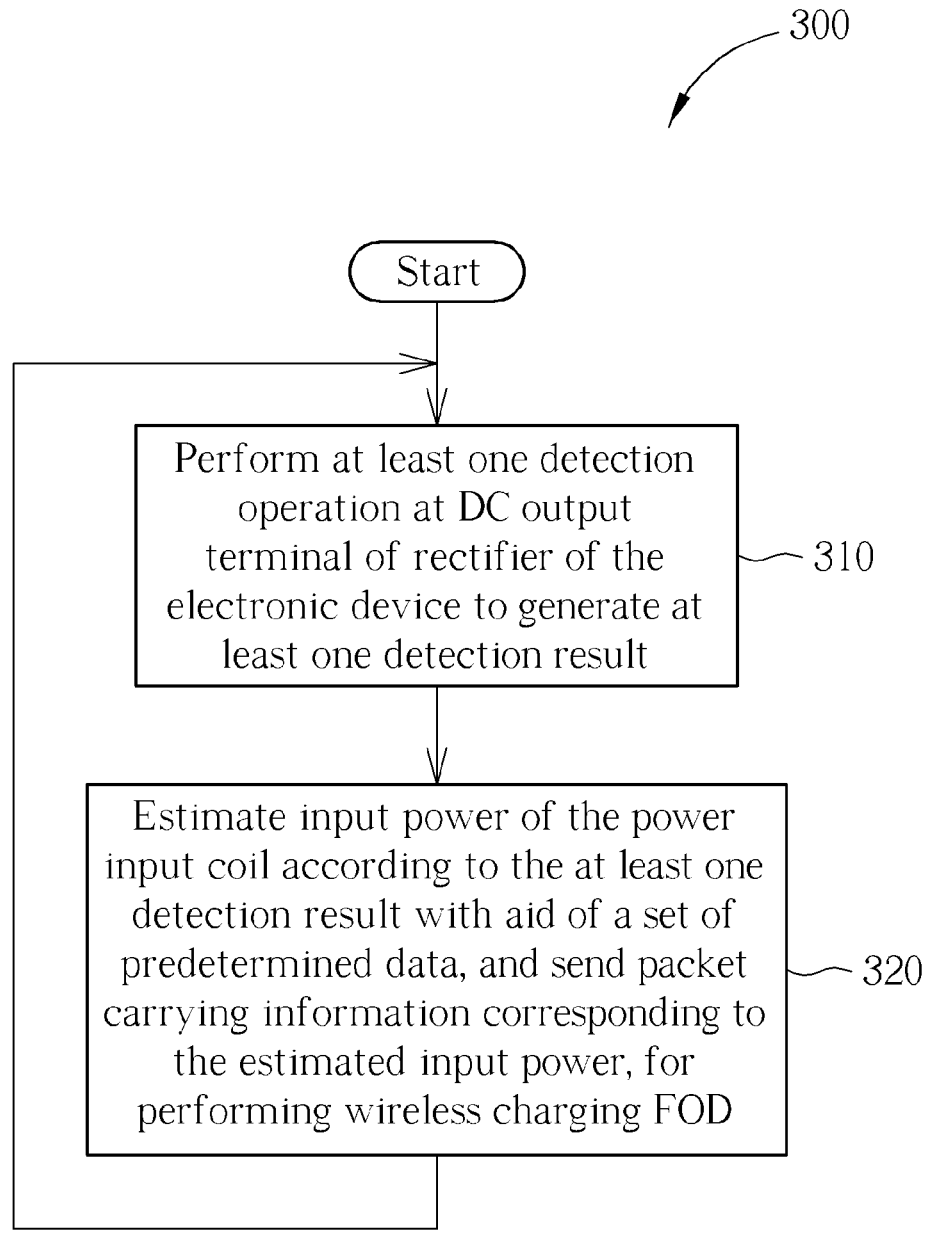
FIG. 3 illustrates a flowchart of a method for performing wireless charging control of an electronic device according to an embodiment of the present invention.

FIG. 3 illustrates a flowchart of a method 300 for performing wireless charging control of an electronic device according to an embodiment of the present invention. The method 300 shown in FIG. 3 can be applied to the apparatus 100 shown in FIG. 1 (more particularly, the wireless power transfer system 200 of the embodiment shown in FIG. 2), and can be applied to the controller 110 thereof. The method can be described as follows.

In Step 310, the detection module 120 performs at least one detection operation (e.g. one or more detection operations) at the DC output terminal T21 of the rectifier 50 to generate at least one detection result (e.g. one or more detection results). More particularly, the detection module 120 detects at least one voltage difference (e.g. one or more voltage differences) between the two terminals of the current sensing resistor R, and utilizes the ADC 122 to convert the aforementioned at least one voltage difference into the aforementioned at least one detection result. For example, the aforementioned at least one detection result may represent at least one digital value (e.g. one or more digital values) carried by the digital signal mentioned in the embodiment shown in FIG. 1, and in this situation, the digital signal mentioned above may carry the aforementioned at least one detection result. In addition, the detection signal Isense of the detection module 120 may carry the aforementioned at least one voltage difference (e.g. the aforementioned one or more voltage differences).

In Step 320, the controller 110 estimates input power of the power input coil 38 (e.g. the received power mentioned above) according to the aforementioned at least one detection result (more particularly, the detection result that is just obtained in Step 310) with aid of a set of predetermined data, and sends a packet carrying information corresponding to the estimated input power, for performing wireless charging FOD, where the set of predetermined data is stored in the NV memory 105. For example, the controller 110 sends the packet carrying the information corresponding to the estimated input power to the transmitter pad 20 through the related components mentioned above (e.g. the communications module 130, the matching circuit 40, the power input coil 38, and the power output coil 28).

In practice, the aforementioned at least one detection result may indicate a current that is output through the DC output terminal T21 of the rectifier 50, since the magnitude of the current passing through the current sensing resistor R can be derived from dividing the aforementioned at least one detection result such as the aforementioned at least one digital value (which can be regarded as the digital form of the aforementioned at least one voltage difference) by the resistance value of the current sensing resistor R.

According to this embodiment, the set of predetermined data mentioned in Step 320 can be prepared in advance, and can be stored in the NV memory 105 in a specific procedure (e.g. a calibration procedure) during the mass production phase of the electronic device mentioned above. As a result, the related art problem of relying on the aforementioned hardware component that needs to be carefully tuned can be prevented.

In addition, in this embodiment, the controller 110 may estimate the input power of the power input coil 38 according to the aforementioned at least one detection result by selectively utilizing at least one portion of the set of predetermined data as a look up table and by selectively utilizing a function obtained from curve fitting of at least one portion of the set of predetermined data (e.g. by selectively utilizing at least one portion of the set of predetermined data as a look up table and/or by utilizing a function obtained from curve fitting of at least one portion of the set of predetermined data), based on different conditions or needs. For example, the controller 110 may estimate the input power of the power input coil 38 according to the aforementioned at least one detection result by utilizing at least one portion of the set of predetermined data as a look up table. In another example, the controller 110 may estimate the input power of the power input coil 38 according to the aforementioned at least one detection result by utilizing a function obtained from curve fitting of at least one portion of the set of predetermined data. In another example, the controller 110 may estimate the input power of the power input coil 38 according to the aforementioned at least one detection result by utilizing at least one portion of the set of predetermined data as a look up table and by utilizing a function obtained from curve fitting of at least one portion of the set of predetermined data. As a result of selectively utilizing at least one portion of the set of predetermined data as a look up table and selectively utilizing a function obtained from curve fitting of at least one portion of the set of predetermined data, the input power of the power input coil 38 can be accurately estimated.

Additionally, the aforementioned at least one detection operation is typically performed in a DC power region of the electronic device, and the input power of the power input coil 38 belongs to an AC power region of the electronic device. Please note that the aforementioned at least one detection operation is not performed at the power input coil 38, where the power input characteristics of the power input coil 38 will not be influenced by the detection module 120 and the aforementioned at least one detection operation since the power input coil 38 and the detection module 120 are positioned at different sides of the rectifier 50 in the architecture shown in FIG. 2, respectively, and are in different types of power regions (e.g. the AC power region and the DC power region mentioned above), respectively.

Figure 4:
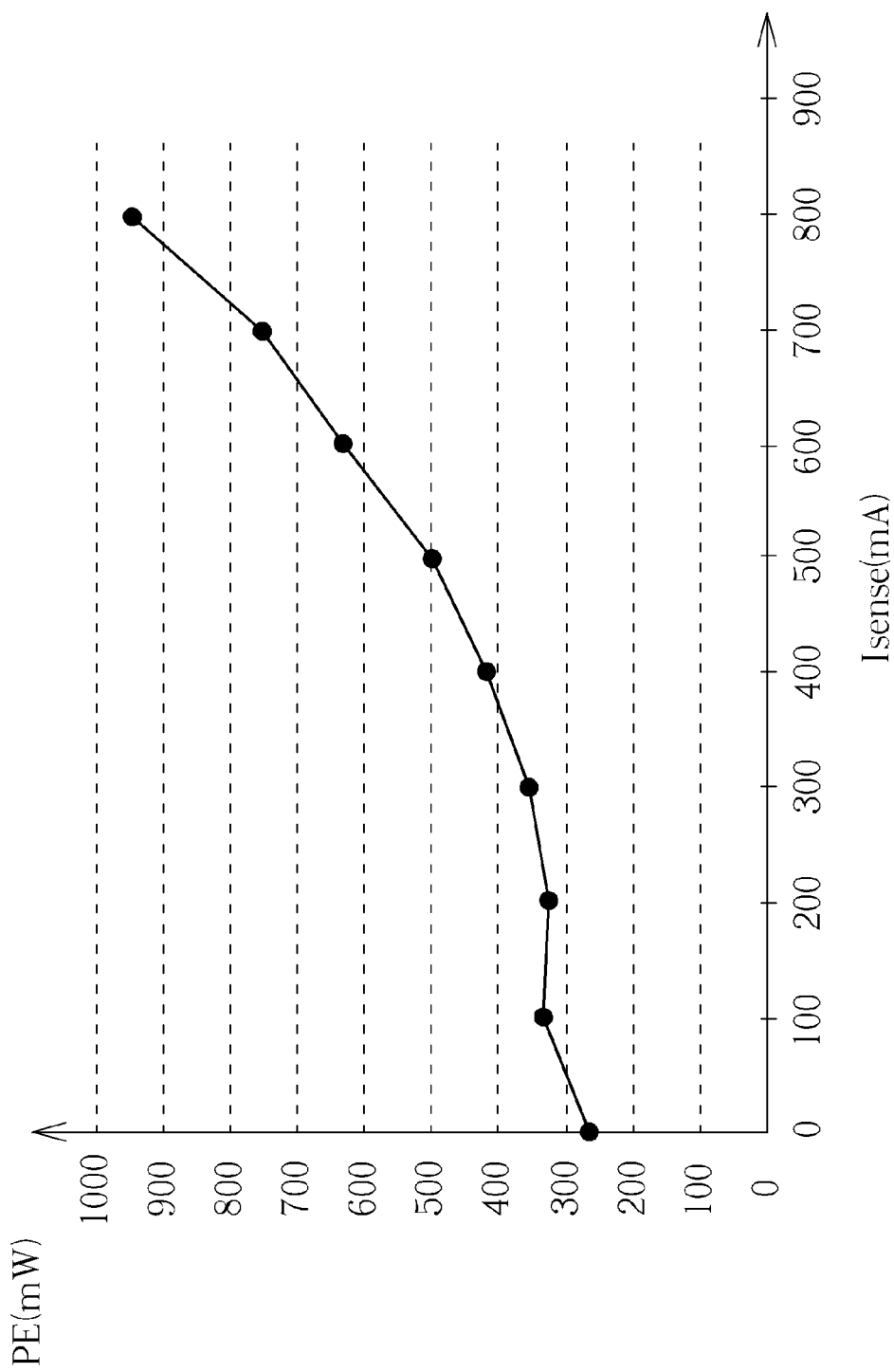
FIG. 4 illustrates a control scheme involved with the method shown in FIG. 3 according to an embodiment of the present invention.

FIG. 4 illustrates a control scheme involved with the method 300 shown in FIG. 3 according to an embodiment of the present invention, where the controller 110 may estimate the input power of the power input coil 38 according to the aforementioned at least one detection result by selectively utilizing at least one portion of the set of predetermined data as a look up table and by selectively utilizing a function obtained from curve fitting of at least one portion of the set of predetermined data.

According to this embodiment, the set of predetermined data may comprise a plurality of data points of (Isense, PE), where the notation "PE" may stand for the estimated power. In addition, the power value of each data point within the plurality of data points of (Isense, PE), such as the estimated power PE, can be prepared in advance, and more particularly, can be an actual measurement value of (or associated with) the input power. As the plurality of data points of (Isense, PE) can be prepared in advance and can be stored in the NV memory 105 in advance, the plurality of data points of (Isense, PE) can be utilized as a function f1(Isense) for converting the aforementioned at least one detection result (more particularly, the detection result that is obtained in Step 310) into the estimated input power mentioned in Step 320. For example, the power value of each data point within the plurality of data points of (Isense, PE), such as the estimated power PE, can be an actual measurement value that is measured (and provided) by specific equipment such as CATS™ Q100 Qi MDT (Mobile Device Tester) known in the related art. For brevity, similar descriptions for this embodiment are not repeated in detail here.

For better comprehension, the horizontal axis in the embodiment shown in FIG. 4 can be illustrated with the unit of milliampere (mA). This is for illustrative purposes only, and is not meant to be a limitation of the present invention. Please note that the aforementioned at least one detection result may indicate the current that is output through the DC output terminal T21 of the rectifier 50, since the magnitude of the current passing through the current sensing resistor R can be derived from dividing the aforementioned at least one detection result such as the aforementioned at least one digital value (which can be regarded as the digital form of the aforementioned at least one voltage difference) by the resistance value of the current sensing resistor R. Thus, according to some variations of the embodiment shown in FIG. 4, the horizontal axis can be illustrated with the actual unit of the aforementioned at least one detection result such as the aforementioned at least one digital value (which can be regarded as the digital form of the aforementioned at least one voltage difference), and more particularly, can be illustrated with any unit regarding voltage, such as millivolt (mV). For brevity, similar descriptions for these variations are not repeated in detail here.

In some embodiments of the present invention, such as some variations of the embodiment shown in FIG. 4, in order to send the aforementioned received power report corresponding to the received power (e.g. the aforementioned received power packet corresponding to the estimated value of the received power) to the transmitter pad 20, the received power Preceived should be determined first. For example, in a variation of the embodiment shown in FIG. 4, given that the notation "PM" is used for representing the measured power, the apparatus 100 (more particularly, the controller 110 thereof) of this variation may determine the received power Preceived according to the following equations:

Preceived=PE+PM, with PM=Vrect*Isense; and

PE=f1(Isense);

where the estimated power PE of this variation may represent the estimated power of the power input coil 38, the matching circuit 40, and the rectifier 50, and the measured power PM of this variation may represent the measured power of the detection module 120, the LDO regulator 60, and the loading of the wireless charging receiver 100R (i.e. the loading coupled to the LDO regulator 60). This is for illustrative purposes only, and is not meant to be a limitation of the present invention. For brevity, similar descriptions for this variation are not repeated in detail here.

According to another variation of the embodiment shown in FIG. 4, the notation "f2" can be used for representing another function, and more particularly, a function for converting the aforementioned at least one detection result (more particularly, the detection result that is obtained in Step 310) into the estimated input power mentioned in Step 320. The apparatus 100 (more particularly, the controller 110 thereof) of this variation may determine the received power Preceived according to the following equation:

Preceived=f2(Isense);

where all of the power values that are needed for preparing the function f2 (Isense), such as those of the power input coil 38, the matching circuit 40, the rectifier 50, the detection module 120, the LDO regulator 60, and the loading of the wireless charging receiver 100R (i.e. the loading coupled to the LDO regulator 60) can be measured (and provided) by the aforementioned specific equipment such as CATS™ Q100 Qi MDT (Mobile Device Tester) mentioned above in advance, and the function f2 (Isense) (or the data points thereof) can be stored in the NV memory 105 in advance. For brevity, similar descriptions for this variation are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing wireless charging control of an electronic device, the method comprising the steps of:
receiving at least one detection result, the detection result indicating a result of a detection operation at a DC output terminal of a rectifier of the electronic device, wherein the rectifier is coupled to a power input coil, wherein the at least one detection result indicates a current that is output through a DC output terminal of the rectifier; and
estimating, by the electronic device, an input power of the power input coil, the input power being estimated using the at least one detection result and a set of predetermined data, the set of predetermined data comprising a first estimated input power level for a first current level of the DC output terminal and a second estimated input power level for a second current level of the DC output terminal, wherein the set of predetermined data is stored in a non-volatile (NV) memory of the electronic device as look up table,
wherein information regarding the estimated input power is transmitted to a transmitter for the transmitter to perform wireless charging foreign object detection (FOD) using the information regarding the estimated input power.

2. The method of claim 1, wherein the rectifier obtains an AC input from the power input coil, and rectifies the AC input to provide a DC output at the DC output terminal.

3. The method of claim 2, wherein the AC input is obtained from the power input coil when the electronic device is wirelessly charged through the power input coil.

4. The method of claim 1, further comprising the step of performing at least one detection operation at the DC output terminal of the rectifier of the electronic device to generate the at least one detection result, the step comprising:
   detecting at least one voltage difference between two terminals of a current sensing resistor, wherein one of the two terminals of the current sensing resistor is coupled to the DC output terminal of the rectifier, and another of the two terminals of the current sensing resistor is coupled to a DC input terminal of a next stage of the rectifier; and
   converting the at least one voltage difference into the at least one detection result.

5. The method of claim 1, wherein the step of estimating the input power of the power input coil comprises:
   estimating the input power of the power input coil using a function obtained from curve fitting of at least one portion of the set of predetermined data.

6. The method of claim 1, wherein the at least one detection operation is performed in a DC power region of the electronic device, and the input power of the power input coil belongs to an AC power region of the electronic device.

7. The method of claim 1, wherein the at least one detection operation is not performed at the power input coil.

8. The method of claim 1, wherein the transmitting comprises sending a packet carrying the information regarding the estimated input power.

9. The method of claim 1, wherein the set of predetermined data is obtained using a calibration procedure.

10. An apparatus for performing wireless charging control of an electronic device, the apparatus comprising at least one portion of the electronic device, the apparatus comprising:
    a controller, arranged to receive at least one detection result, wherein the at least one detection result indicates a current that is output through a DC output terminal of a rectifier of the electronic device, the controller being arranged to receive a set of predetermined data representing at least first and second estimated input power levels as a function of current levels of a DC output terminal of the rectifier, the controller being arranged to estimate input power of a power input coil coupled to the rectifier, the input power being estimated using the at least one detection result and the set of predetermined data, and arranged to transmit information regarding the estimated input power to a transmitter for the transmitter to perform wireless charging foreign object detection (FOD), wherein the set of predetermined data is stored in a non-volatile (NV) memory of the electronic device as look up table.

11. The apparatus of claim 10, wherein the apparatus comprises the rectifier; the rectifier obtains an AC input from the power input coil, and rectifies the AC input to provide a DC output at the DC output terminal.

12. The apparatus of claim 11, wherein the AC input is obtained from the power input coil when the electronic device is wirelessly charged through the power input coil.

13. The apparatus of claim 10, further comprising a detection module, wherein the detection module comprises:
    a current sensing resistor, wherein one of two terminals of the current sensing resistor is coupled to the DC output terminal of the rectifier, and another of the two terminals of the current sensing resistor is coupled to a DC input terminal of a next stage of the rectifier;
wherein the apparatus comprises:
    an analog-to-digital converter (ADC), coupled to the current sensing resistor, arranged to perform analog-to-digital conversion on a detection signal of the detection module, in order to generate a digital signal, wherein the digital signal carries the at least one detection result;
wherein the detection module detects at least one voltage difference between the two terminals of the current sensing resistor, and utilizes the ADC to convert the at least one voltage difference into the at least one detection result; and the detection signal of the detection module carries the at least one voltage difference.

14. The apparatus of claim 10, wherein the controller estimates the input power of the power input coil using a function obtained from curve fitting of at least one portion of the set of predetermined data.

15. The apparatus of claim 10, wherein the at least one detection operation is performed in a DC power region of the electronic device, and the input power of the power input coil belongs to an AC power region of the electronic device.

16. The apparatus of claim 10, wherein the at least one detection operation is not performed at the power input coil.

17. The apparatus of claim 10, wherein the controller is configured to send a packet carrying the information regarding the estimated input power.

18. The apparatus of claim 10, wherein the set of predetermined data is obtained using a calibration procedure.

19. An apparatus for performing wireless charging control of an electronic device, the apparatus comprising at least one portion of the electronic device, the apparatus comprising:
    a controller, arranged to receive at least one detection result, wherein the at least one detection result indicates a current that is output through a DC output terminal of a rectifier of the electronic device, the controller being arranged to receive a set of predetermined data representing at least first and second estimated input power levels as a function of current levels of a DC output terminal of the rectifier, arranged to estimate input power of a power input coil coupled to the rectifier, the input power being estimated using the at least one detection result and a set of predetermined data comprising a first estimated input power level for a first current level of the DC output terminal and a second estimated input power level for a second current level of the DC output terminal, wherein the set of predetermined data is stored in a non-volatile (NV) memory of the electronic device as look up table.

20. The apparatus of claim 19, wherein the first estimated input power is higher than the second estimated input power and the first current level is higher than the second current level.

21. The apparatus of claim 19, wherein the apparatus is configured to transmit information regarding the estimated input power to a transmitter to perform wireless charging foreign object detection (FOD).

* * * * *